(12) United States Patent
Oberhauser (10) Patent No.: US 8,990,044 B2
(45) Date of Patent: Mar. 24, 2015

(54) REVOLUTION COUNTER AND METHOD FOR DETERMINING THE NUMBER OF REVOLUTIONS OF A SHAFT

(75) Inventor: Johann Oberhauser, Vachendorf (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 932 days.

(21) Appl. No.: 13/140,201

(22) PCT Filed: Dec. 14, 2009

(86) PCT No.: PCT/EP2009/067092
§ 371 (c)(1),
(2), (4) Date: Jun. 16, 2011

(87) PCT Pub. No.: WO2010/069928
PCT Pub. Date: Jun. 24, 2010

(65) Prior Publication Data
US 2011/0257931 A1    Oct. 20, 2011

(30) Foreign Application Priority Data

Dec. 19, 2008  (DE) .................. 10 2008 054 973

(51) Int. Cl.
*G01D 5/14* (2006.01)
*G01B 7/30* (2006.01)
(Continued)

(52) U.S. Cl.
CPC ..................... *G01D 5/145* (2013.01)
USPC ........... 702/151; 702/150; 702/145; 702/155; 702/163; 702/193; 324/207.25

(58) Field of Classification Search
CPC ....... G01D 5/20; G01D 5/145; G01D 5/2451; G01D 5/34738; G01D 5/3473
USPC ......... 702/151, 150, 94; 341/115; 324/207.25
See application file for complete search history.

(56) References Cited

U.S. PATENT DOCUMENTS 3,631,469 A * 12/1971 Levy ............................ 341/115
3,673,585 A *  6/1972 Tripp et al. .............. 340/870.34
(Continued)

FOREIGN PATENT DOCUMENTS

CN         2697595 Y      5/2005
DE   10 2006 035 120 A1   1/2008
(Continued)

OTHER PUBLICATIONS

English Translation of DE102006035120 A1, Granig Wolfgang et al., Jan. 2008.*

(Continued)

*Primary Examiner* — Hyun Park
*Assistant Examiner* — Yoshihisa Ishizuka
(74) *Attorney, Agent, or Firm* — Brinks Gilson & Lione (57) ABSTRACT

A revolution counter including sensors, which generate position values that define an angular position of a shaft, and a determination unit that receives the position values and generates decision signals therefrom, wherein the decision signals determine counting sectors. The revolution counter includes a counting control unit that receives the counting sectors, and operates the revolution counter in a first mode or a second mode of operation. The counting control unit switches over to the second mode, if after a length of time no change in one of the counting sectors takes place, and switches over to the first mode if a change in one of the counting sectors does take place. The determination unit determines an uncertainty range between each pairing of the counting sectors. The counting control unit does not take the uncertainty ranges into account for the switchover from the second mode to the first mode.

17 Claims, 6 Drawing Sheets

(51) Int. Cl.
  *G01P 3/00*  (2006.01)
  *G01B 7/00*  (2006.01)
  *G01B 7/02*  (2006.01)
  *H04B 15/00* (2006.01)

(56) References Cited

U.S. PATENT DOCUMENTS

| | | | | |
|---|---|---|---|---|
| 5,525,885 | A * | 6/1996 | Sato | 318/632 |
| 6,323,786 | B1 | 11/2001 | Sakuma et al. | |
| 6,407,377 | B1 | 6/2002 | Mettler | |
| 7,046,176 | B2 * | 5/2006 | Okamuro et al. | 341/115 |
| 7,719,264 | B2 | 5/2010 | Tiemann | |
| 2003/0072405 | A1 * | 4/2003 | Siess et al. | 377/82 |
| 2008/0079422 | A1 * | 4/2008 | Tiemann | 324/207.17 |

FOREIGN PATENT DOCUMENTS

| | | |
|---|---|---|
| DE | 10 2006 046 531 A1 | 4/2008 |
| EP | 1 076 226 B1 | 11/2006 |

OTHER PUBLICATIONS

Office Action for corresponding Chinese patent application 200980151012.1.

* cited by examiner

REVOLUTION COUNTER AND METHOD FOR DETERMINING THE NUMBER OF REVOLUTIONS OF A SHAFT

Applicant claims, under 35 U.S.C. §§120 and 365, the benefit of priority of the filing date of Dec. 14, 2009 of a Patent Cooperation Treaty patent application, copy attached, Serial Number PCT/EP2009/067092, filed on the aforementioned date, the entire contents of which are incorporated herein by reference, wherein Patent Cooperation Treaty patent application Serial Number PCT/EP2009/067092 was not published under PCT Article 21(2) in English.

Applicant claims, under 35 U.S.C. §119, the benefit of priority of the filing date of Dec. 19, 2008 of a German patent application, copy attached, Serial Number 10 2008 054 973.8, filed on the aforementioned date, the entire contents of which is incorporated herein by reference.

BACKGROUND OF THE INVENTION

Field of the Invention

The present invention relates to a revolution counter and to a method for determining the number of revolutions of a shaft. A revolution counter of this kind and a method according to the present invention are suitable for instance for use in a position measuring instrument, in particular in a multi-turn angle encoder.

Position measuring instruments for detecting the angular position of a shaft are widely used in the drive system industry. Such instruments include a scale, usually in the form of a code disk, on which a graduation structure is applied and whose scanning makes it possible to ascertain the angular position of the shaft. Optical, magnetic or inductive scanning principles are usually used here.

Often, however, such position measuring instruments determine not only the position within one revolution of the shaft but the number of revolutions that have occurred. Here, either by scanning additional graduation structures on the code disk already present for detecting the angular position of the shaft, or by scanning an additional scale disposed separately on the shaft, directionally dependent counting pulses for a counter are generated. The counter value is a measure of the number of revolutions of the shaft that have occurred. Once again, completely different scanning principles may be employed for determining the angular position of the shaft within one revolution and for determining the number of revolutions, such as optical scanning for the angular position and magnetic scanning for the number of revolutions.

The disadvantage of the event of a loss of the supply voltage of the revolution counter, for instance if the counter value is lost when the machine that drives the shaft to be measured is switched off, is typically counteracted by providing a battery for that eventuality, which takes on the task of supplying voltage for the revolution counter during that period of time. It is also known that the life of the battery can be extended if in the battery mode the position of the shaft for determining the number of revolutions is not detected continuously but rather is determined only at certain time intervals. In other words, only a pulsed mode takes place.

German Patent Disclosure DE 10 2006 046 531 A1 of the present Applicant, for instance, describes an angle encoder, based on the inductive scanning principle, which has a mode of operation for battery operation, in which the exciter current of the exciter conductor tracks is pulsed, and only then are rotational-angle-dependent voltage pulses induced in the receiver conductor tracks.

German Patent Disclosure DE 10 2006 035 120 A1 describes a circuit arrangement in which the angular position, in particular the number of revolutions, of the shaft is determined by magnetic field sensors. Once again, a current-saving mode is provided that is achieved by a pulsed mode. It was also recognized that at the transition from one quadrant to the next quadrant, problems in the counting can occur.

European Patent Disclosure EP 1 076 226 B1 also describes an absolute angle encoder, in which the revolution counter is implemented by optical scanning that is likewise done in only pulsed fashion. There, the current consumption was reduced still further because the number of measurement pulses is reduced when the shaft is at a stop or the rotary speed of the shaft is very slow, and an increase to a maximum number of pulses takes place only if it is detected that the actual angle sector is being exceeded. However, it can then happen that if the shaft coincidentally remains stopped at precisely a transition from one angle sector to the adjacent one, for instance because of intrinsic noise in the system, a segment transition is sporadically detected, and thus despite the fact that the shaft is stopped, a switch to the maximum number of pulses is made again and again.

It is therefore an object of the present invention to develop an improved revolution counter as well as an improved method for determining the number of revolutions of a shaft.

SUMMARY AND OBJECTS OF THE INVENTION

This object is attained by a revolution counter for determining the number of revolutions of a shaft, the revolution counter including sensors, with which position values that define an angular position of a shaft are generated, and a determination unit that receives the position values from the sensors and generates decision signals from the position values, wherein the decision signals determine counting sectors within one revolution of the shaft. The revolution counter further includes a counting control unit that receives the counting sectors from the determination unit, wherein the counting control unit, which as a function of a chronological order of the counting sectors operates the revolution counter in a first mode of operation or in a second mode of operation. The counting control unit switches over to the second mode of operation, which is an energy-saving pulsed mode, if after a defined length of time no change in one of the counting sectors takes place, and switches over to the first mode of operation if a change in one of the counting sectors does take place. The determination unit determines an uncertainty range between each pairing of the counting sectors and the counting control unit does not take the uncertainty ranges which adjoins one of the counting sectors that has led to a switchover to the second mode of operation into account for the switchover from the second mode of operation to the first mode of operation.

This object is attained by a method for determining a number of revolutions of a shaft, in which sensors of a revolution counter are provided, with which position values that define an angular position of the shaft are generated and are delivered to a determination unit of the revolution counter, which from the position values generates decision signals, which determines counting sectors within one revolution of the shaft. The method includes delivering decision signals from the determination unit to a counting control unit, wherein the decision signals as a function of a logical order of the counting sectors operates the revolution counter in a first mode of operation or in a second mode of operation and generates counting signals for a counter. The method further includes switching over, via the counting control unit, to the second mode of operation, which is an energy-saving pulsed mode, if after a defined length of time no change in one of the counting sectors is determined and switching over, via the controlling unit, to the first mode of operation if a change in one of the counting sectors is determined. The method further includes determining, via the determination unit, between each two counting sectors, one uncertainty range, and the uncertainty ranges which adjoin a counting sector that has led to a switchover to the second mode of operation are not taken into account for the switchover from the second mode of operation to the first mode of operation.

Accordingly, the revolution counter for determining the number of revolutions of a shaft includes sensors, with which position values that define the angular position of the shaft can be generated, a determination unit, in which from the position values, decision signals can be generated, which determine the counting sectors within one revolution of the shaft, and a counting control unit, which as a function of the chronological order of the counting sectors operates the revolution counter in a first mode of operation or in a second mode of operation, and the counting control unit switches over to the second mode of operation, which is an energy-saving pulsed mode, if after a defined length of time no change in a counting sector takes place, and switches over to the first mode of operation if a change in a counting sector does take place.

Moreover, the determination unit is designed additionally for determining an uncertainty range between each two counting sectors. In addition, the counting control unit is designed for not taking the uncertainty ranges which adjoin a counting sector that has led to a switchover to the second mode of operation into account for the switchover from the second mode of operation to the first mode of operation.

The revolution counter can be operated in an especially energy-saving way if the first and the second modes of operation are each a pulsed mode of the revolution counter, in which the position values can be generated in pulsed fashion at a specified scanning rate. In addition, the scanning rate is higher in the first mode of operation than in the second mode of operation.

The determination unit is designed for coding one revolution of the shaft into a plurality of counting sectors, in particular four counting sectors, that can be distinguished from one another and at least one respective uncertainty range between two counting sectors.

The determination unit has comparators, which for instance form a window comparator.

With the present invention, a method for determining the number of revolutions of a shaft is also disclosed, in which sensors are provided, with which position values that define the angular position of the shaft are generated and are delivered to a determination unit. From the position values generates decision signals, the determination unit determines counting sectors within one revolution of the shaft, and the decision signals are delivered to a counting control unit. A function of the logical order of the counting sectors by the counting control unit is to operate the revolution counter in a first mode of operation or in a second mode of operation and generates counting signals for a counter. The counting control unit switches over to the second mode of operation, which is an energy-saving pulsed mode, if after a defined length of time no change in a counting sector is determined and switches over to the first mode of operation if a change in a counting sector is determined.

Between each two counting sectors, the determination unit additionally determines one uncertainty range. In addition, the uncertainty ranges which adjoin a counting sector that have led to a switchover to the second mode of operation are not taken into account for the switchover from the second mode of operation to the first mode of operation.

An especially energy-saving mode is obtained if the first and the second modes of operation are each a pulsed mode of the revolution counter, in which the position values can be generated in pulsed fashion at a specified scanning rate. In addition, and the scanning rate is higher in the first mode of operation than in the second mode of operation.

The determination unit codes one revolution of the shaft into a plurality of counting sectors, in particular four counting sectors, that can be distinguished from one another and at least one respective uncertainty range between two counting sectors.

Advantages and details of the present invention will become apparent from the ensuing description of a revolution counter and a method for determining the number of revolutions of a shaft, in conjunction with the drawings.

DESCRIPTION OF THE PREFERRED EMBODIMENT(S) OF THE INVENTION

Figure 1:
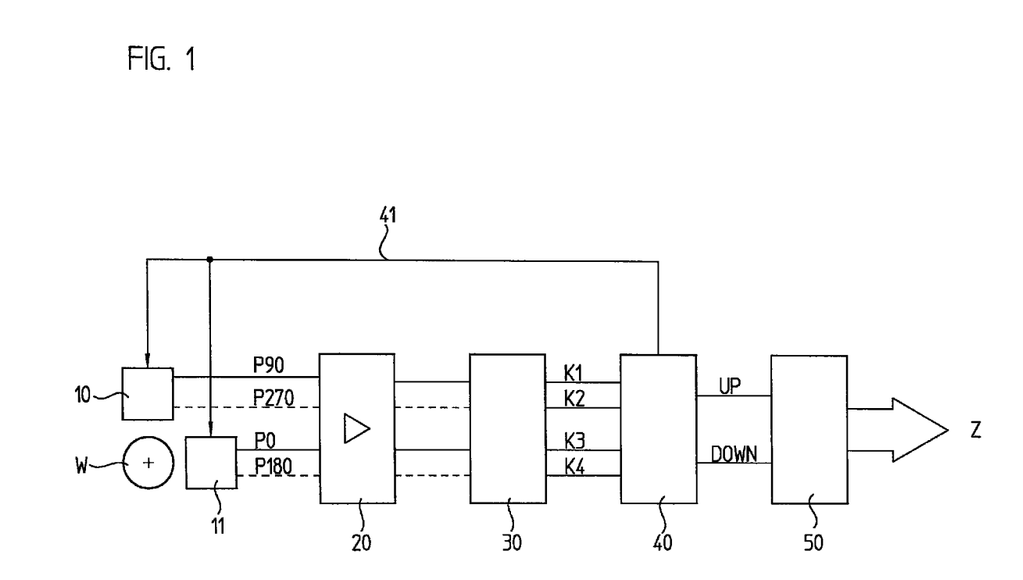
FIG. 1 shows a block diagram of an embodiment of a revolution counter according to the present invention.

FIG. 1 shows a block diagram of a revolution counter according to the present invention. A shaft W is scanned by two sensors 10, 11. The present invention is independent of the physical principle of the scanning. Accordingly, the makeup of the sensors 10, 11 and the fundamental scanning unit can vary. If an optical scanning principle is employed, then a code disk, for instance, is connected in a manner fixed against relative rotation to the shaft W on which there is a code track, which includes two annular segments, distinguishable from one another by their optical properties (transparent/nontransparent, reflective/nonreflective), which each enclose an angular range of 180°. The scanning is done in the known fashion by a light source; correspondingly, the sensors 10, 11 are photodetectors. In the magnetic scanning principle, a disklike magnet is disposed on the shaft W and its magnetic poles make it possible to distinguish 180° of one revolution of the shaft W. In that case, the scanning is done by magnetic sensors 10, 11. In inductive scanning, the sensors 10, 11 are receiver coils, in which, by an electromagnetic field that is generated by an exciter coil, a voltage is induced, whose amplitude is dependent on the position of regions of a code track on a code disk that is connected to the shaft W in a manner fixed against relative rotation. The regions of the code track amplify or attenuate a magnetic field. The regions of the code track also enclose angle sectors of 180°, while the receiver coils are embodied in such a way that the amplitude of the induced voltage reaches one maximum and one minimum per revolution of the shaft.

Figure 2:
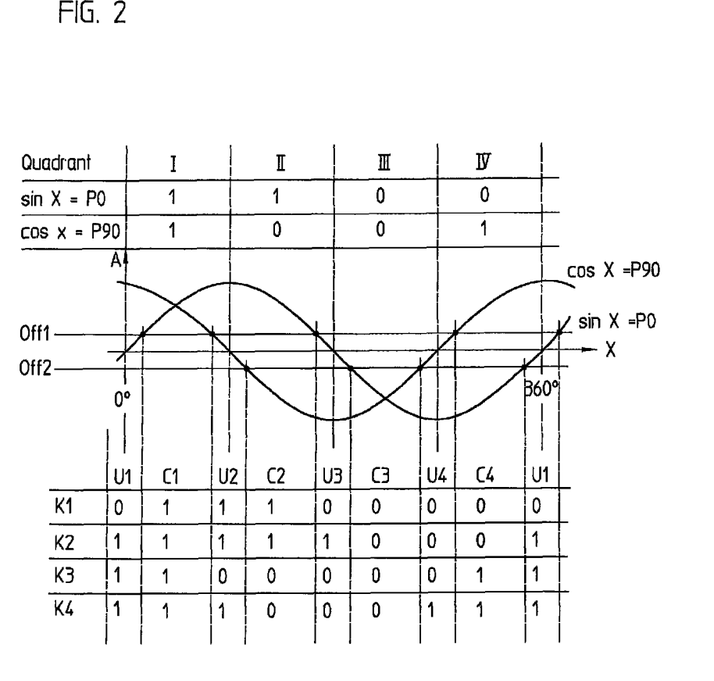
FIG. 2 shows possible position values of the sensors of the revolution counter of FIG. 1, with counting sectors determined from them and with uncertainty ranges in accordance with the present invention.
Figure 4:
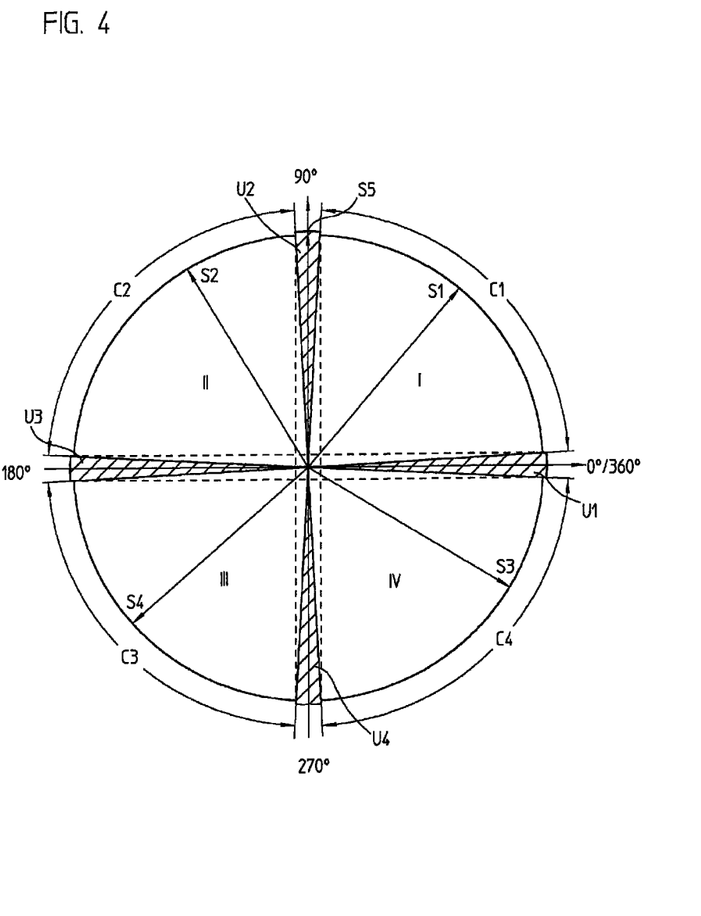
FIG. 4 is a vector diagram for explaining the principle of revolution counting by the revolution counter of FIG. 1 in accordance with the present invention.

The scanning of the angular position of the shaft W is designed such that during one revolution of the shaft W the sensors 10, 11, generate position signals P0=sin x, P90=cos x, with one signal period per revolution. The position signals P0, P90 of the sensors 10, 11 have a phase displacement that is advantageously 90°. From the position signals P0, P90, it is now possible to distinguish four quadrants I, II, III, IV per revolution of the shaft W, and a revolution counter is achieved in a known manner by determining the chronological order of the quadrants I, II, III, IV. Both the position signals P0 and P90 and the associated quadrants I, II, III, IV are shown in FIGS. 2 and 4.

It is especially advantageous if the sensors 10, 11 also generate position signals P180=-sin x, P270=-cos x that are inverse to the position signals P0, P90, since in that case a differential processing of two each position signals P0 and P180, and P90 and P270, that are phase-offset by 180° is made possible and thus increased security against interference is achieved.

For reasons of current consumption or to increase the life of the battery, a current-saving mode of operation is possible in the revolution counter. In that case, the position signals P0, P90 are not detected continuously; instead, only respective instantaneous values are measured. This pulsed mode is achieved by supplying the sensors 10, 11 and/or at least parts of the following evaluation circuits with current only at intervals over time, or in other words when they are operated in pulsed fashion.

Accordingly, the revolution counter can be operated in at least two modes of operation, in which the second mode of operation permits more energy-saving operation than the first mode.

The first mode of operation can be a continuous mode, in which all the electrical components of the revolution counter are supplied with energy continuously, and the second mode of operation can be an energy-saving pulsed mode.

An especially energy-saving mode can be achieved if the first mode of operation is already a pulsed mode, and the second mode of operation is also a pulsed mode. In addition, the pulse rate or in that case the scanning rate as well in the second mode of operation is lower than in the first mode of operation. This mode is especially energy-saving and will be described in greater detail hereinafter.

The principle of the revolution counting is shown in FIG. 2 and in FIG. 4 in a vector diagram. FIG. 2 shows how the half-waves of the position signals P0, P90 are assigned logical levels, as follows:

If the first position signal P0 is in the positive half-wave (angular range of the shaft W of 0°-180°), this is equivalent to a logical high level ("1"); the negative half-wave (angular range of the shaft W of 180°-360°) is equivalent to a logical low level ("0"). Because of the 90° phase offset, for the second position signal P90 a logical high level ("1") is the result for the positive half-wave (angular range of the shaft W from 0°-90° and 270-360°) and a logical low level ("0") is the result for the negative half-wave (angular range of the shaft W from 90°-270°).

Given this association, the four quadrants I, II, III, IV can be unambiguously distinguished in accordance with the following table, as can also be seen from FIG. 2:

Quadrant I: (P0=1) AND (P90=1)
Quadrant II: (P0=1) AND (P90=0)
Quadrant III: (P0=0) AND (P90=0)
Quadrant IV: (P0=0) AND (P90=1)

Because of the phase offset between the position signals P0, P90, it is furthermore possible to detect the direction of rotation; for the pulsed mode, there is the resultant restriction that even at a maximum rotary speed of the shaft W, at least one measurement value per quadrant has to be detected. In other words, the scanning rate SR with which instantaneous values of the position signals P0, P90 are detected must be at least four times the number of revolutions of the shaft W. If two measurement values picked up successively are located in opposite quadrants, then it cannot be distinguished in which direction of rotation this quadrant was reached. Thus if a first scanning pulse S1 that furnishes measurement values in the first quadrant I, and if the measurement values of the successive scanning pulses S2 or S3 are located in quadrants II or IV, then unambiguous, directionally dependent revolution counting is possible; if the measurement value that follows at a scanning pulse S4 is located in the third quadrant III, then an error occurs, since a statement cannot be made as to the direction of rotation in which the shaft W has rotated in order to engender measurement values in the third quadrant.

Figure 5:
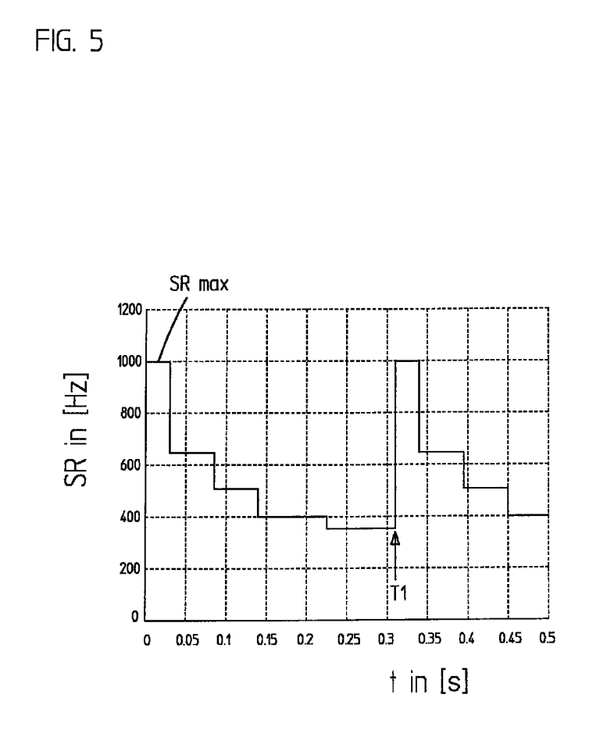
FIG. 5 is a graph for illustrating the reduction in the scanning rate over time in accordance with the present invention.

As noted at the outset, the consumption current in pulsed scanning can be further reduced if the scanning rate SR is reduced when the shaft W is stopped or is revolving very slowly. This situation is shown in FIG. 5. As the maximum scanning rate SRmax, 1000 scanning pulses per second are assumed, which is equivalent to a maximum rotary speed of the shaft W of 250 revolutions per second. If for a defined number of scanning pulses, 32 in the example shown, no change of quadrant is recognized, then the scanning rate SR is reduced in defined steps. This can be done in stages, as shown, or in one step, that is, from a maximum scanning rate SRmax to a minimum scanning rate SRmin. As soon as a quadrant change is determined (for instance at time T1), the scanning rate SR is reset to the maximum scanning rate SRmax. The minimum scanning rate SRmin must be selected such that at a maximum acceleration of the shaft W, a fast switch can be made again to the maximum scanning rate SRmax such that no quadrant change is overlooked which could allow a miscount or an undefined state to occur.

If the scanning pulses are located in the immediate vicinity of a quadrant transition, it can happen that the measurement values sporadically indicate a quadrant change even though the shaft W has not moved. The causes of these tripping actions can for instance be intrinsic system noise, measurement tolerances and interference factors, engendered by the installation surroundings. These kinds of interference mean that when the scanning rate SR has already been reduced, each time the measurement value "jumps" from one quadrant to the quadrant next to it, or in other words without an actual movement of the shaft W, a switch is repeatedly made back to the maximum scanning rate SRmax again, and thus the current consumption rises again significantly. In FIG. 4, a fifth scanning pulse S5 is shown as an example of a scanning pulse that can result in uncertain measurement values.

According to the present invention, uncertainty ranges U1 through U4 are now defined in the vicinity of quadrant transitions. If it is now determined that the scanning pulse S5 is furnishing a measurement value which is located within the uncertainty range U2 that adjoins the quadrant most recently determined (for instance, quadrant I), then this measurement is not taken into account, neither for counting the revolutions of the shaft W nor as a criterion for increasing the scanning rate SR. However, if the next measurement value is unambiguously in the next quadrant II, minus the uncertainty range U2 (thus in the example, in the range C2), or in quadrant III, or in quadrant IV, minus the uncertainty range U1 (thus in the example, in the range C4), or in an uncertainty range U that does not adjoin the most recently determined quadrant I (in the example, U3, U4), then counting takes place. The uncertainty ranges U1 through U4 are defined such that they entirely exclude the angular range around a segment or quadrant transition where "jumping" of the measurement value can occur.

As the block diagram in FIG. 1 shows, the distinction as to whether the shaft W at a scanning time is in an adjoining uncertainty range U, or in other words whether the measurement value will not be further evaluated, or the present quadrant can be determined unambiguously, is made in a determination unit 30. Before the position signals P0, P90, and optionally the inverse position signals P180, P270, of the sensors 10, 11 can be delivered to the determination unit 30, they can be delivered to a signal processing unit 20, which for instance amplifies the signals and optionally converts current signals into voltage signals. While in the conventional evaluation it is merely determined which half-wave the position signals P0, P90, P180, P270 should be assigned to, it is now determined whether the position signals P0, P90, P180, P270 are located before, after, or in the immediate vicinity of a change of a half-wave, or in other words in an uncertainty range U. The uncertainty ranges U are determined on the basis of the position values P0, P90 by the determination unit 30.

The determination unit 30 outputs digital decision signals K1, K2, K3, K4. The logical levels of the decision signals K1, K2, K3, K4 are shown in FIG. 2. These logical levels in combination code both the uncertainty ranges U1, U2, U3 and U4 and the angle sectors C1, C2, C3, C4 located between them in such a manner that they are distinguishable from one another. The angle sectors C1, C2, C3, C4 define counting sectors, that is, angular ranges, that can be associated with certainty with a quadrant I, II, III, IV. The uncertainty ranges U1, U2, U3, U4 are advantageously selected such that they enclose a substantially smaller angular range than the counting sectors C1, C2, C3, C4. Typically, one uncertainty range U encloses a segment transition or quadrant transition symmetrically with an angle sector of 2° to 10°, and in practice, values between 3° and 5° are preferably selected.

Figure 3:
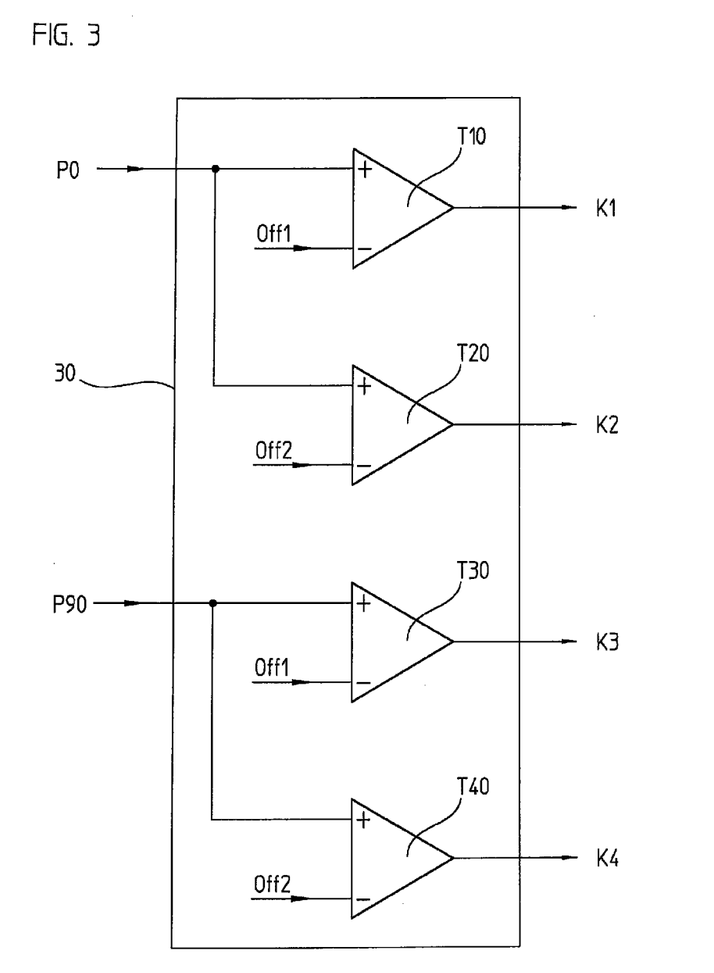
FIG. 3 shows an embodiment of a determination unit used in the revolution counter of FIG. 1 for forming angle sectors that can be distinguished from one another in accordance with the present invention.

One example of a determination unit 30 is shown in FIG. 3. The determination unit 30 includes a plurality of comparators T10, T20, T30, T40, which compare the position signals P0=sin x, P90=cos x with comparison signals Off1 and Off2 and as the outcome of comparison, they each output a respective decision signal K1, K2, K3, K4. The comparison signals Off1 and Off2 determine the size of the angle sector of the uncertainty ranges U1, U2, U3 and U4. If Off2=−Off1, then the uncertainty ranges U1, U2, U3 and U4 are each disposed symmetrically to the corresponding quadrant change.

The decision signals K1, K2, K3, K4 are now delivered to a counting control unit 40, which evaluates the logical levels of the decision signals K1, K2, K3, K4, or the change in logical levels, for generating counting signals UP, DOWN for a counter 50. In the process, uncertainty ranges U which adjoin the angular range most recently evaluated for generating counting signals UP, DOWN, are not taken into account for the generation of counting signals UP, DOWN, since as described above, in these adjoining uncertainty ranges U a certain statement cannot be made as to whether in fact a rotation of the shaft W has occurred, or not.

The sensors 10, 11 and the counting control unit 40 are all designed such that they permit a pulsed mode. To that end, the counting control unit 40, via a scanning clock line 41, generates scanning pulses S for scanning the sensors 10, 11, so that the position signals P0, P90 indicate instantaneous values of the angular position of the shaft W. As a result, upon a revolution of the shaft W, although not necessarily all the angular ranges that are codable with the decision signals K1, K2, K3, K4 are also determined, still uncertainty ranges U, which adjoin an angular range evaluated for generating counting signals UP, DOWN, are again not taken into account for the generation of counting signals UP, DOWN.

One example of this:

If on the basis of the position signals P0, P90 upon a measurement, that is, a scanning corresponding to the scanning pulse S1 shown in FIG. 4, the counting sector C1 in quadrant I is determined as an angular range and was evaluated for generating a counting signal UP, DOWN, and in an ensuing measurement, an uncertainty range U2 or U1 adjoining the counting sector C1 in quadrant I is determined, then the associated decision signals K1, K2, K3, K4 are not taken into account for the generation of counting signals UP, DOWN. If the measurement values from the ensuing measurement are conversely in a counting sector C4, C3, C2 or in one of the uncertainty ranges U3, U4 that does not adjoin the quadrant I, then they are evaluated for generating counting signals UP, DOWN.

At a standstill, or at a very slow speed of revolution, a reduction in the scanning rate SR is now performed, as shown in FIG. 5, if a defined number of scanning pulses S determines no change in an angular range, that is, no change in the decision signals K1, K2, K3, K4 is determined. If the angular range that has led to a reduction in the scanning rate SR changes, then the scanning rate SR is increased only whenever the decision signals K1, K2, K3, K4 show no uncertainty range U adjoining that angular range. For the above example, this means that a reduction in the scanning rate SR is performed if a defined number of scanning pulses S is determined within the counting sector C1 in the first quadrant I. However, the scanning rate SR is not increased again unless some other angular range than the two adjoining uncertainty ranges U1, U2 is indicated. This ensures that an increase in the scanning rate SR takes place only whenever an angular motion of the shaft W has in fact occurred. As described above, in that case the scanning rate SR is set to the maximum scanning rate SRmax.

The counter value Z at the output of the counter 50 simultaneously corresponds to the output value Z of the revolution counter. Depending on the definition, the counting control unit 40 generates a counting signal UP, DOWN at each quadrant transition, or at only a certain number of transitions, in this example at every fourth quadrant transition, or in other words after every complete revolution of the shaft W.

Figure 6:
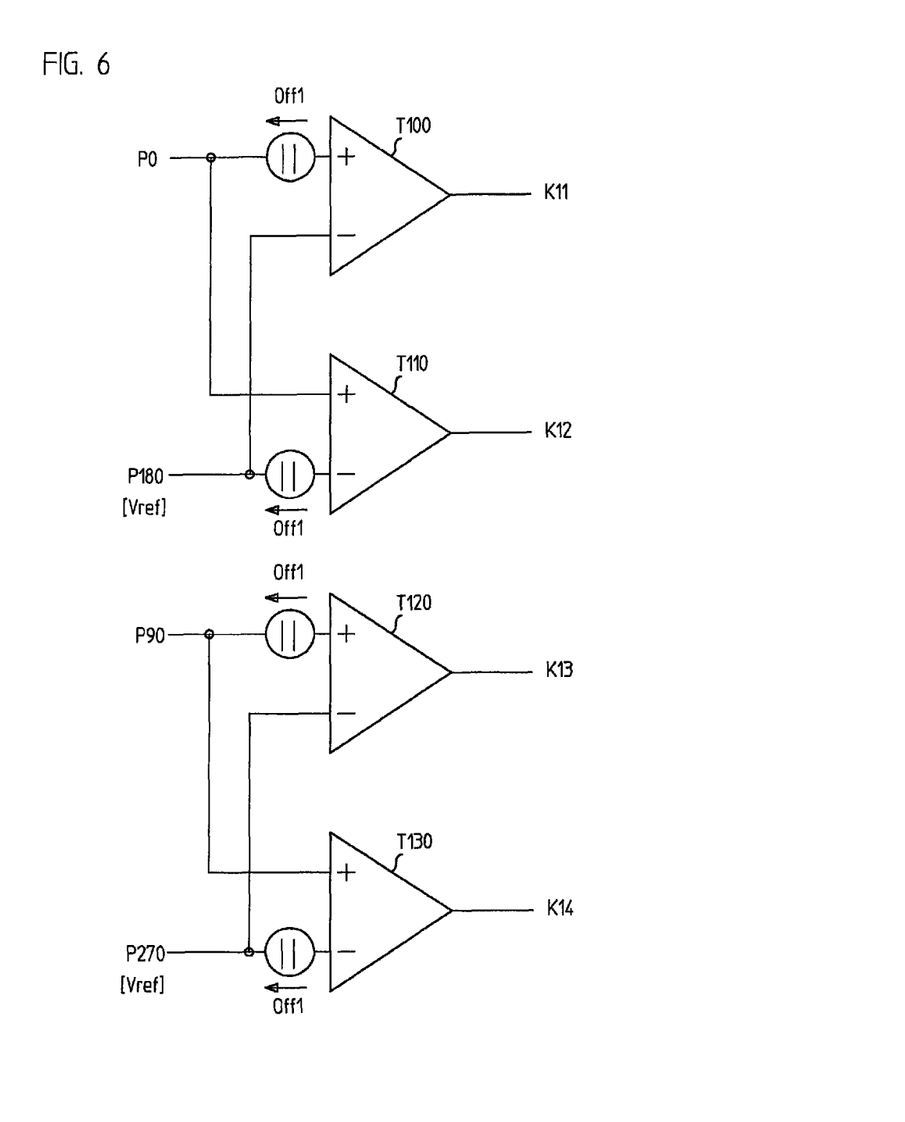
FIG. 6 is a basic circuit diagram for a second embodiment of a determination unit to be used with the revolution counter of FIG. 1 in accordance with the present invention.

FIG. 6 shows a further example of a determination unit, with which, from the position signals P0, P90 and the position signals P180, P270 that are inverse to them, decision signals K11, K12, K13 and K14 can be generated. Such decision signals K11, K12, K13 and K14 which code the uncertainty ranges U1, U2, U3, U4, shown in FIG. 4, and the counting sectors C1, C2, C3 and C4 in such a manner that they are distinguishable from one another. For generating the first positive decision signal K11, a comparison signal Off1 is added to the first position signal P0, and the total signal is delivered to the noninverting input of a first comparator T100. The comparison takes place with the first inverse position signal P180 that is delivered to the inverting input of the first comparator T100.

A decision signal K12 is formed with a second comparator T110 to which the first position signal P0 is delivered at its noninverting input. A total signal of the first inverse position signal P180 and the comparison signal Off1 is delivered to its inverting input.

Analogously, a decision signal K13 is formed by comparison of a total signal comprising the second position signal P90 and the comparison signal Off1 to the second inverse position signal P270, by a third comparator T120.

Finally, a further decision signal K14 is generated with a fourth comparator T130, in that the second position signal P90 is compared with a total signal comprising the second inverse position signal P270 and the comparison signal Off1.

If the inverse position signals P180, P270 are not available, then instead, as indicated in square brackets, a reference voltage Vref is used, which corresponds to a mean value between the maximum and minimum values of the sensor signals P0, P90.

If a constant voltage value is used as the comparison signal Off1, Off2, then the angle sector that defines an uncertainty range U changes, as indicated in FIG. 4 by the dashed lines around the quadrant transitions. Advantageously, the comparison signal Off1, Off2 is therefore adapted in proportion to the amplitude of the associated position signal P0, P90.

Further embodiment variations of the method and devices in accordance with the present invention of course exist besides the explained examples and embodiments.

I claim:

1. A revolution counter for determining the number of revolutions of a shaft, the revolution counter comprising:
   sensors, with which position values that define an angular position of a shaft are generated;
   a determination unit that receives said position values from said sensors and generates decision signals from said position values, wherein said decision signals determine counting sectors within one revolution of said shaft;
   a counting control unit that receives said counting sectors from said determination unit, wherein said counting control unit, which as a function of a chronological order of said counting sectors operates said revolution counter in a first mode of operation or in a second mode of operation, and said counting control unit switches over to said second mode of operation, which is an energy-saving pulsed mode, if after a defined length of time no change in one of said counting sectors takes place, and switches over to said first mode of operation if a change in one of said counting sectors does take place;
   wherein said determination unit determines an uncertainty range between each pairing of said counting sectors; and
   said counting control unit does not take said uncertainty ranges which adjoins one of said counting sectors that has led to a switchover to said second mode of operation into account for said switchover from said second mode of operation to said first mode of operation.

2. The revolution counter as defined by claim 1, characterized in that said first mode of operation and said second mode of operation are each a pulsed mode of said revolution counter, in which said position values can be generated in pulsed fashion at a specified scanning rate, wherein said scanning rate is higher in said first mode of operation than in said second mode of operation.

3. The revolution counter as defined by claim 2, wherein said determination unit codes one revolution of said shaft into a plurality of counting sectors that can be distinguished from one another and at least one respective uncertainty range between two counting sectors.

4. The revolution counter as defined by claim 1, wherein said determination unit codes one revolution of said shaft into a plurality of counting sectors that can be distinguished from one another and at least one respective uncertainty range between two counting sectors.

5. The revolution counter as defined by claim 1, wherein said determination unit comprises comparators.

6. The revolution counter as defined by claim 1, wherein said determination unit determines a numerical value for said uncertainty range.

7. The revolution counter as defined by claim 6, wherein said uncertainty range regards an angle sector.

8. The revolution counter as defined by claim 7, wherein said numerical value is between 2° and 10°.

9. A method for determining a number of revolutions of a shaft, in which sensors of a revolution counter are provided, with which position values that define an angular position of said shaft are generated and are delivered to a determination unit of said revolution counter, which from said position values generates decision signals, which determines counting sectors within one revolution of said shaft, said method comprising:
   delivering decision signals from said determination unit to a counting control unit, wherein said decision signals as a function of a logical order of said counting sectors operates said revolution counter in a first mode of operation or in a second mode of operation and generates counting signals for a counter;
   switching over, via said counting control unit, to said second mode of operation, which is an energy-saving pulsed mode, if after a defined length of time no change in one of said counting sectors is determined and switching over, via said controlling unit, to said first mode of operation if a change in one of said counting sectors is determined;
   determining, via said determination unit, between each two counting sectors, one uncertainty range, and said uncertainty ranges which adjoin a counting sector that has led to a switchover to said second mode of operation are not taken into account for said switchover from said second mode of operation to said first mode of operation.

10. The method as defined by claim 9, wherein said first mode of operation and said second mode of operation are each a pulsed mode of said revolution counter, in which said position values can be generated in pulsed fashion at a specified scanning rate, wherein said scanning rate is higher in said first mode of operation than in said second mode of operation.

11. The method as defined by claim 10, further comprising coding, via said determination unit, one revolution of said shaft into a plurality of counting sectors that can be distinguished from one another and at least one respective uncertainty range between two counting sectors.

12. The method as defined by claim 11, wherein said coding into counting sectors that can be distinguished from one another and into uncertainty ranges of one revolution of said shaft is effected by a comparator.

13. The method as defined by claim 9, further comprising coding, via said determination unit, one revolution of said shaft into a plurality of counting sectors that can be distinguished from one another and at least one respective uncertainty range between two counting sectors.

14. The method as defined by claim 13, wherein said coding into counting sectors that can be distinguished from one another and into uncertainty ranges of one revolution of said shaft is effected by a comparator.

15. The method as defined by claim 9, wherein said determination unit determines a numerical value for each of said uncertainty ranges.

16. The method as defined by claim 15, wherein each of said uncertainty ranges regards an angle sector.

17. The method as defined by claim 16, wherein said numerical value for each of said uncertainty ranges is between 2° and 10°.

* * * * *